US008032866B1

(12) United States Patent
Golender et al.

(10) Patent No.: US 8,032,866 B1
(45) Date of Patent: Oct. 4, 2011

(54) SYSTEM AND METHOD FOR TROUBLESHOOTING RUNTIME SOFTWARE PROBLEMS USING APPLICATION LEARNING

(75) Inventors: Valery Golender, Kfar Saba (IL); Vladislav Gusev, Kiev (UA)

(73) Assignee: Identify Software Ltd. (IL)

( * ) Notice: Subject to any disclaimer, the term of this patent is extended or adjusted under 35 U.S.C. 154(b) by 1227 days.

(21) Appl. No.: 10/808,760

(22) Filed: Mar. 25, 2004

Related U.S. Application Data

(60) Provisional application No. 60/458,322, filed on Mar. 27, 2003.

(51) Int. Cl.
*G06F 9/44* (2006.01)
(52) U.S. Cl. ............... 717/128; 717/131; 714/38
(58) Field of Classification Search .................. None
See application file for complete search history.

(56) References Cited

U.S. PATENT DOCUMENTS

| | | |
|---|---|---|
| 4,503,495 A | 3/1985 | Boudreau |
| 4,511,960 A | 4/1985 | Boudreau |
| 4,598,364 A | 7/1986 | Gum et al. |
| 4,782,461 A | 11/1988 | Mick et al. |
| 4,879,646 A | 11/1989 | Iwasaki et al. |
| 5,021,949 A | 6/1991 | Morten et al. |
| 5,121,489 A | 6/1992 | Andrews |
| 5,193,180 A | 3/1993 | Hastings |
| 5,265,254 A | 11/1993 | Blasiak et al. |
| 5,297,274 A | 3/1994 | Jackson |
| 5,335,344 A | 8/1994 | Hastings |
| 5,347,649 A | 9/1994 | Alderson |
| 5,386,522 A | 1/1995 | Evans |
| 5,386,565 A | 1/1995 | Tanaka et al. |
| 5,394,544 A | 2/1995 | Motoyama et al. |

(Continued)

FOREIGN PATENT DOCUMENTS

WO    WO 96-05556    2/1996

OTHER PUBLICATIONS

Lee et al. Learning Patterns from Unix Process Execution Traces for Intrusion Detection, AAAI Technical Report 1997. [retrieved on Jun. 11, 2009] Retrieved from the Internet: URL<https://www.aaai.org/Papers/Workshops/1997/WS-97-07/WS97-07-010.pdf.*

(Continued)

*Primary Examiner* — Tuan Q Dam
*Assistant Examiner* — Cheneca Smith
(74) *Attorney, Agent, or Firm* — Knobbe Martens Olson & Bear, LLP

(57) ABSTRACT

Analysis of execution traces to identify execution problems is described. Analysis of the execution trace allows the user to detect application execution patterns. Each pattern represents a sequence of operations performed by the application. Some patterns correspond to normal execution of the application. Some patterns correspond to typical operations such as file opening, file saving, site browsing, mail sending. Diagnostic classes include patterns associated with certain malfunctions. In one embodiment, the system includes a learning mode wherein the system accumulates patterns belonging to different classes and stores them in a pattern database. In one embodiment, the system also includes a recognition mode where the system matches the trace against the pattern database and assigns trace regions to specific classes such as normal, abnormal, classes of specific problems or user activities, etc.

38 Claims, 13 Drawing Sheets
(2 of 13 Drawing Sheet(s) Filed in Color)

U.S. PATENT DOCUMENTS

| | | | |
|---|---|---|---|
| 5,408,650 | A | 4/1995 | Arsenault |
| 5,410,685 | A | 4/1995 | Banda et al. |
| 5,421,009 | A | 5/1995 | Platt |
| 5,446,876 | A | 8/1995 | Levine et al. |
| 5,450,586 | A | 9/1995 | Kuzara et al. |
| 5,465,258 | A | 11/1995 | Adams |
| 5,481,740 | A | 1/1996 | Kodosky |
| 5,483,468 | A | 1/1996 | Chen et al. |
| 5,513,317 | A | 4/1996 | Borchardt et al. |
| 5,526,485 | A | 6/1996 | Brodsky |
| 5,533,192 | A | 7/1996 | Hawley et al. |
| 5,551,037 | A | 8/1996 | Fowler et al. |
| 5,574,897 | A | 11/1996 | Hermsmeier et al. |
| 5,581,697 | A | 12/1996 | Gramlich et al. |
| 5,590,354 | A | 12/1996 | Klapproth et al. |
| 5,612,898 | A | 3/1997 | Huckins |
| 5,615,331 | A | 3/1997 | Toorians et al. |
| 5,632,032 | A | 5/1997 | Ault et al. |
| 5,642,478 | A | 6/1997 | Chen et al. |
| 5,657,438 | A | 8/1997 | Wygodny et al. |
| 5,732,210 | A | 3/1998 | Buzbee |
| 5,740,355 | A | 4/1998 | Watanabe et al. |
| 5,745,748 | A | 4/1998 | Ahmad et al. |
| 5,771,385 | A | 6/1998 | Harper |
| 5,781,720 | A | 7/1998 | Parker et al. |
| 5,848,274 | A | 12/1998 | Hamby et al. |
| 5,867,643 | A | 2/1999 | Sutton |
| 5,870,606 | A | 2/1999 | Lindsey |
| 5,896,535 | A | 4/1999 | Ronstrom |
| 5,903,718 | A | 5/1999 | Marik |
| 5,928,369 | A | 7/1999 | Keyser et al. |
| 5,938,778 | A | 8/1999 | John, Jr. et al. |
| 5,940,618 | A | 8/1999 | Blandy et al. |
| 5,960,198 | A | 9/1999 | Roediger et al. |
| 5,983,366 | A | 11/1999 | King |
| 6,003,143 | A | 12/1999 | Kim et al. |
| 6,026,433 | A | 2/2000 | D'Arlach et al. |
| 6,026,438 | A | 2/2000 | Piazza et al. |
| 6,047,124 | A * | 4/2000 | Marsland ................ 717/128 |
| 6,065,043 | A | 5/2000 | Domenikos et al. |
| 6,108,330 | A | 8/2000 | Bhatia et al. |
| 6,202,199 | B1 * | 3/2001 | Wygodny et al. ............ 717/125 |
| 6,219,826 | B1 * | 4/2001 | De Pauw et al. ............. 717/116 |
| 6,237,138 | B1 | 5/2001 | Hameluck et al. |
| 6,263,456 | B1 | 7/2001 | Boxall et al. |
| 6,282,701 | B1 | 8/2001 | Wygodny et al. |
| 6,321,375 | B1 | 11/2001 | Blandy |
| 6,360,331 | B2 | 3/2002 | Vert et al. |
| 6,374,369 | B1 | 4/2002 | O'Donnell |
| 6,415,394 | B1 | 7/2002 | Fruehling et al. |
| 6,467,052 | B1 | 10/2002 | Kaler et al. |
| 6,490,696 | B1 | 12/2002 | Wood et al. |
| 6,507,805 | B1 | 1/2003 | Gordon et al. |
| 6,557,011 | B1 * | 4/2003 | Sevitsky et al. ............ 707/104.1 |
| 6,634,001 | B2 * | 10/2003 | Anderson et al. ............... 714/38 |
| 6,865,508 | B2 | 3/2005 | Ueki et al. |
| 7,058,928 | B2 | 6/2006 | Wygodny et al. |
| 7,089,536 | B2 | 8/2006 | Ueki et al. |
| 7,114,150 | B2 | 9/2006 | Dimpsey et al. |
| 7,386,839 | B1 | 6/2008 | Golender et al. |
| 2002/0087949 | A1 | 7/2002 | Golender et al. |
| 2003/0005414 | A1 | 1/2003 | Elliott et al. |
| 2003/0088854 | A1 | 5/2003 | Wygodny et al. |
| 2004/0060043 | A1 | 3/2004 | Frysinger et al. |
| 2006/0150162 | A1 | 7/2006 | Mongkolsmai et al. |
| 2006/0242627 | A1 | 10/2006 | Wygodny et al. |
| 2008/0244534 | A1 | 10/2008 | Golender et al. |

OTHER PUBLICATIONS

Hofmeyr et al. Intrusion Detection Using Sequences of System Calls, Journal of Computer Security, 1998 pp. 151-180, Retrieved on [Aug. 13, 2010], Retrieved from the Internet <http://www.cs.unm.edu/~steveah/jcs-accepted.pdf>.*

Bowring et al, Active Learning for Automatic Classification of Software Behavior, ISSTA'04 Proceedings of the 2004 ACM SIGSOFT, vol. 29, issue 4, Jul. 2004, pp. 195-205, Retrieved on [Jan. 28, 2011] Retrieved from the Internet: URL<http://portal.acm.org/ft_gateway.cfm?id=1007539&type=pdf&CFID=7071442&CFTOKEN=55167073>.*

Abramson, D., et al., "A Debugging Tool for Software Evolution", CASE-95, 7th International Workshop on Computer-Aided Software Engineering, Jul. 1995.

Appelbe et al., "Integrating tools for debugging and developing multitasking programs," ACM, 1993, pp. 78-88.

Bates, Peter C., "Debugging Heterogeneous Distributed Systems Using Event-Based Models of Behavior," ACM Transactions on Computer Systems, vol. 13, No. 1, Feb. 1995, pp. 1-31.

Bruegge, C.P. et al., "A Framework for Dynamic Program Analyzers," OOPSLA, 1993, pp. 62-85.

Forrest, S., et al., "A sense of self for Unix processes," Proceedings of 1996 IEEE Symposium on Computer Security and Privacy, 1996, pp. 120-128.

Geer, C.P. et al., "Instruction Stream Trace," IBM Technical Disclosure Bulletin, vol. 26, No. 11, Apr. 1984, pp. 6217-6220.

Goldszmidt et al, "Interactive blackbox debugging for concurrent language", ACM pp. 271-282, 1990.

Harward, L.D. Jr., "PL/1 Trace Program," IBM Technical Disclosure Bulletin, vol. 13, No. 4, Sep. 1970, pp. 855-857.

Hunt, T.A., "General Trace Facility," IBM Technical Disclosure Bulletin, vol. 15, No. 8, Jan. 1973, pp. 2446-2448.

Larus, James R., "Efficient Program Tracing," IEEE, May 1993, pp. 52-61.

Malony, Allen D. et al., "Traceview: A Trace Visualization Tool," IEEE, Sep. 1991, pp. 19-28.

Martonosi, Margaret et al., "Effectiveness of Trace Sampling for Performance Debugging Tools," ACM SIGMETRICS, 1993, pp. 248-259.

Meier, Michael S., et al., "Experiences with Building Distributed Debuggers," SPDT, 1996, pp. 70-79.

Mukherjea, Sougata et al., "Applying Algorithm Animation Techniques for Program Tracing, Debugging, and Understanding," IEEE, 1993, pp. 456-465.

Netzer, Robert H.B., "Optimal Tracing and Replay for Debugging Shared-Memory Parallel Programs," ACM/ONR Workshop on Parallel and Distributed Debugging, May 17-18, 1993, San Diego, California, pp. 1-12.

Netzer, Robert H.B. et al., "Optimal Tracing and Replay for Debugging Message-Passing Parallel Programs," IEEE, 1992, pp. 502-511.

Netzer, H.B., et al., "Optimal Tracing and Incremental Reexecution for Debugging Long-Running Programs," ACM SIGPLAN 1994 Conference on Programming Language Design and Implementation, Jun. 20-24, Orlando, Florida, pp. 313-325.

Plattner, Bernhard et al., "Monitoring Program Execution: A Survey," IEEE, Nov. 1981, pp. 76-93.

Redell, "Experience with Topaz teledebugging", ACM SIGPLAN & SIGOPS, pp. 35-44, 1990.

Reiss, Steven P., "Trace-Based Debugging," Automated and Algorithmic Debugging Workshop, May 3-5, 1993.

Rosenberg, Jonathan B., How Debuggers Work: Algorithms, Data Structures, and Architecture, John Wiley & Sons, Inc., 1996.

Schieber, Colleen et al., "Ratchet: Real-time Address Trace Compression Hardware for Extended Traces," Performance Evaluation Review, vol. 21, Nos. 3 and 4, Apr. 1994, pp. 22-32.

Soule, K., "Algorithm for Tracing Execution Paths to a Given Location in a Program," IBM Technical Disclosure Bulletin, vol. 14, No. 4, Sep. 1971, pp. 1016-1019.

Spinellis, Diomidis, "Trace: A Tool for Logging Operating System Call Transactions," Operating Systems Review Publication, vol. 28, No. 4, Oct. 1994, pp. 56-63.

Timmerman, F Gielen et al., "High Level Tools for the Debugging of Real-Time Multiprocessor Systems," ACM/ONR Workshop on Parallel and Distributed Debugging, May 17-18, 1993, San Diego, California, pp. 151-158.

Tsai, Jeffrey J.P. et al., "A Noninvasive Architecture to Monitor Real-Time Distributed Systems," IEEE, Mar. 1990, pp. 11-23.

Ueki, K., et al., "A Probe Debugging Method", Technical Report of Ieice, Jul. 2000.

Wilner, David, "WindView: A Tool for Understanding Real-time Embedded Software through System Visualization," ACM SIGPLAN Notices, vol. 30, No. 11, Nov. 1995, pp. 117-123.

Wismuller, "Debugging of globally optimized programs using data flow analysis", ACM SIGPLAN, Apr. 1994, pp. 278-289.

Jeffrey K. Hollingsworth and Barton P. Miller, "An Adaptive Cost System for Parallel Program Instrumentation"—Proceedings of the Second International Euro-Par Conference on Parallel Processing—vol. 1, 1996, 10 pages.

Paolo Bellavista, Antonio Corradi, and Cesare Stefanelli, "Java for On-Line Distributed Monitoring of Heterogeneous Systems and Services"—The Computer Journal, vol. 45, No. 6, 2002, 13 pages.

Martin Shulz, John May, and John Gyllenhaal, "DynTG: A Tool for Interactive, Dynamic Instrumentation"—ICCS 2005, LNCS 3515, 2005, 9 pages.

Daniel Reed et al. "An Overview of the Pablo Performance Analysis Environment"—University of Illinois Department of Computer Science, Nov. 7, 1992, 45 pages.

Celine Boutros Saab, Xavier Bonnaire, and Bertil Folliot "Phoenix: A Self Adaptable Monitoring Platform for Cluster Management"—Cluster Computing 5, 2002, 11 pages.

Weiming Gu et al. "Falcon: On-line monitoring and Steering of Large-Scale Parallel Programs", Proceedings of the Fifth Symposium on the Frontiers of Massively Parallel Computation, 1995, 38 pages.

* cited by examiner

SYSTEM AND METHOD FOR TROUBLESHOOTING RUNTIME SOFTWARE PROBLEMS USING APPLICATION LEARNING

REFERENCE TO RELATED APPLICATION

The present application claims priority benefit of U.S. Provisional Patent Application No. 60/458,322, filed Mar. 27, 2003, titled "SYSTEM AND METHOD FOR TROUBLESHOOTING RUNTIME SOFTWARE PROBLEMS USING APPLICATION LEARNING," the disclosure of which is incorporated herein by reference in its entirety.

REFERENCE TO COLOR DRAWINGS

The present application contains at least one drawing executed in color. Copies of this patent application with color drawings will provided by the Office upon request and payment of the necessary fee.

BACKGROUND OF THE INVENTION

1. Field of the Invention

The present invention relates to software tools for assisting software developers and users in the task of monitoring and analyzing the execution of computer programs, such as during the troubleshooting process.

2. Description of the Related Art

The software industry faces a challenge in fighting malfunctions (colloquially known as "bugs") that occur in the released versions of commercial software. Such malfunctions cause serious problems both for customers and vendors. It is often difficult to identify the particular situation, or situations, that leads to the malfunction and this adds to the difficulty of finding the root-cause of the malfunction in the application code or coding environment. The problem is especially difficult if it appears only at a remote customer site and is not reproducible in the development and testing environments. Remote software troubleshooting based on run-time execution tracing of applications in production environments is often used to identify and diagnose such malfunctions. This approach provides insight into the running application and allows gathering of execution traces that record function calls, variables, source lines and other important information. However, analysis of program execution traces and understanding of the root-cause of a program error is a tedious and time-consuming task. The execution trace log can contain thousands of function calls and other entries corresponding to events that happened just before the malfunction.

SUMMARY OF THE INVENTION

The present invention solves these and other problems associated with software troubleshooting (debugging) by analyzing execution traces of software programs. The analysis provides reduction and classification of the data that is presented to the user (the user typically being a software analyst tasked with locating the cause of the malfunction). The user, working with the tracing tool, has the option of not analyzing the raw execution trace log containing a relatively large list of low-level events. Rather, the user can view a relatively smaller processed log that categorizes the low-level events into relatively higher-level events attributed to known classes or regions of normal functioning or different anomalies. In one embodiment, the analysis program can send alerts on known classes of problems or anomalies Analysis of the execution trace allows the user to detect the application execution patterns. Each pattern represents a sequence of operations performed by the application. Patterns are associated with the situation classes. Thus it is possible to identify patterns that represent a relatively broad class of normal execution of the application. Other classes include patterns for typical operations such as file opening, file saving, site browsing, mail sending, etc. For diagnostic purposes, the classes include patterns associated with certain malfunctions. In one embodiment, the system includes a learning mode and a recognition mode. In the learning mode the system accumulates patterns belonging to different classes and stores them in a pattern database. In the recognition mode, the system matches the trace against the pattern database and assigns trace regions to specific classes of execution, such as, for example, normal execution classes, abnormal execution classes, execution classes related to specific problems, execution related to user activities, etc.

In one embodiment, the learning mode includes an automatic learning sub-mode. In one embodiment, the learning mode includes a user-guided learning sub-mode In the learning mode the system accumulates patterns belonging to different execution classes and stores them in a database. Automatic learning is often used for accumulating patterns belonging to a generic class corresponding to normal execution. User-guided learning involves activity of a user who selects certain log regions and attributes them to a particular execution class such as normal execution, execution classes related to specific problems, execution related to user activities, etc.

In the recognition mode, the system matches the trace against the pattern database and assigns trace regions to specific execution classes. Of special interest is the abnormal execution class. A trace region (e.g., a group of events in the execution trace log) is attributed to the abnormal execution class if it contains a relatively high density of unknown patterns. This class usually marks situations related to software malfunctions or insufficient training data in the pattern database. If the user who works with the system decides that the abnormality region appeared because it is related to a new execution path that was not encountered during learning, the analyst can assign it to the normal class using the user-guided learning mode.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A software system which embodies the various features of the invention will now be described with reference to the following drawings.

In the drawings, like reference numbers are used to indicate like or functionally similar elements. In addition, the first digit or digits of each reference number generally indicate the figure number in which the referenced item first appears.

DETAILED DESCRIPTION

Figure 1:
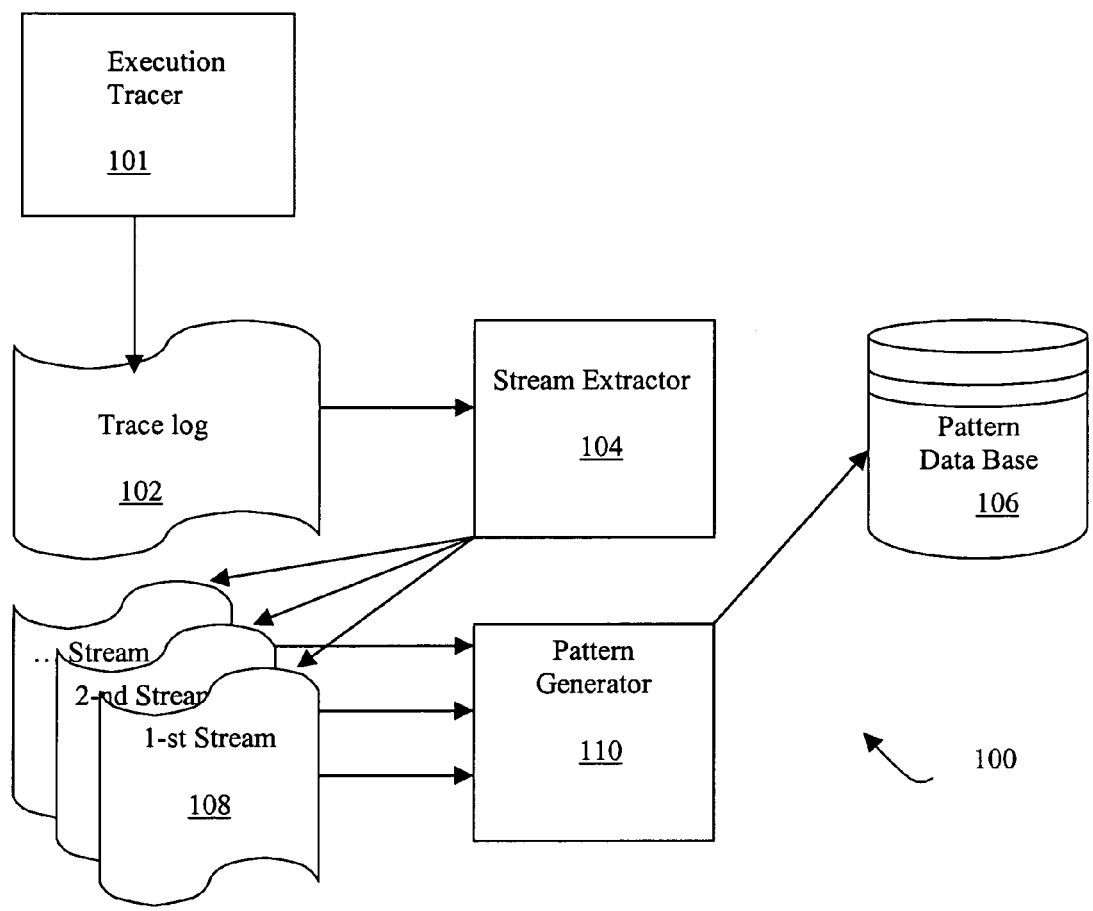
FIG. 1 is a block diagram of the automatic learning process.

FIG. 1 is a block diagram of an automatic pattern learning process 100, where an execution tracer 101 produces a runtime trace log 102 of an application. Execution tracing is described, for example, in U.S. Pat. No. 6,202,199, the entire contents of which is hereby incorporated by reference. The trace log 102 is initially post-processed and separated into logical streams 108 by a stream extractor 104. A pattern generator 110 generates patterns from the streams and checks to see if a found pattern is present in a pattern database 106. New patterns are added to the database.

Figure 2:
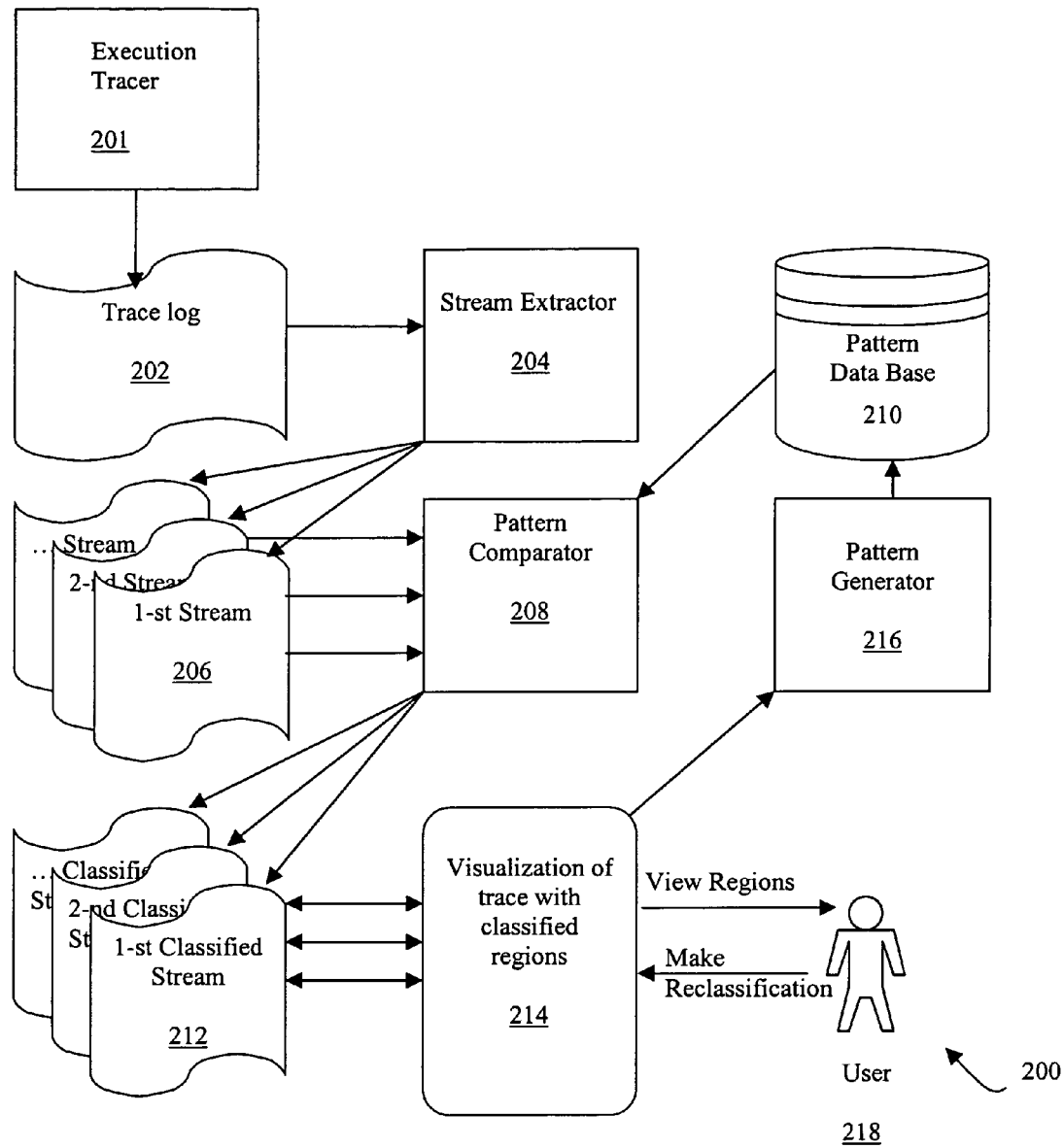
FIG. 2 is a block diagram of the user-assisted learning process.

FIG. 2 is a block diagram of a user-assisted pattern learning process 200, where an execution tracer 201 produces a trace log 202. The trace log 202 is initially post-processed and separated into logical streams 206 by a stream extractor 204. A pattern comparator 208 classifies streams according to patterns stored in a pattern database 210. Classified streams 212 are visualized on the computer screen using a classified trace view 214. The trace view 214 includes a situation tree view. The situation tree view differs from an ordinary trace tree view in the prior art by including additional intermediate nodes that embrace child nodes of operations attributed to particular classes and labels for those classes. A user 218 views classified regions and can manually select a region of the trace log 202 and assign the selected region to a particular execution class. The pattern generator 216 extracts new patterns from the region and saves them in the pattern database 210.

Figure 3:
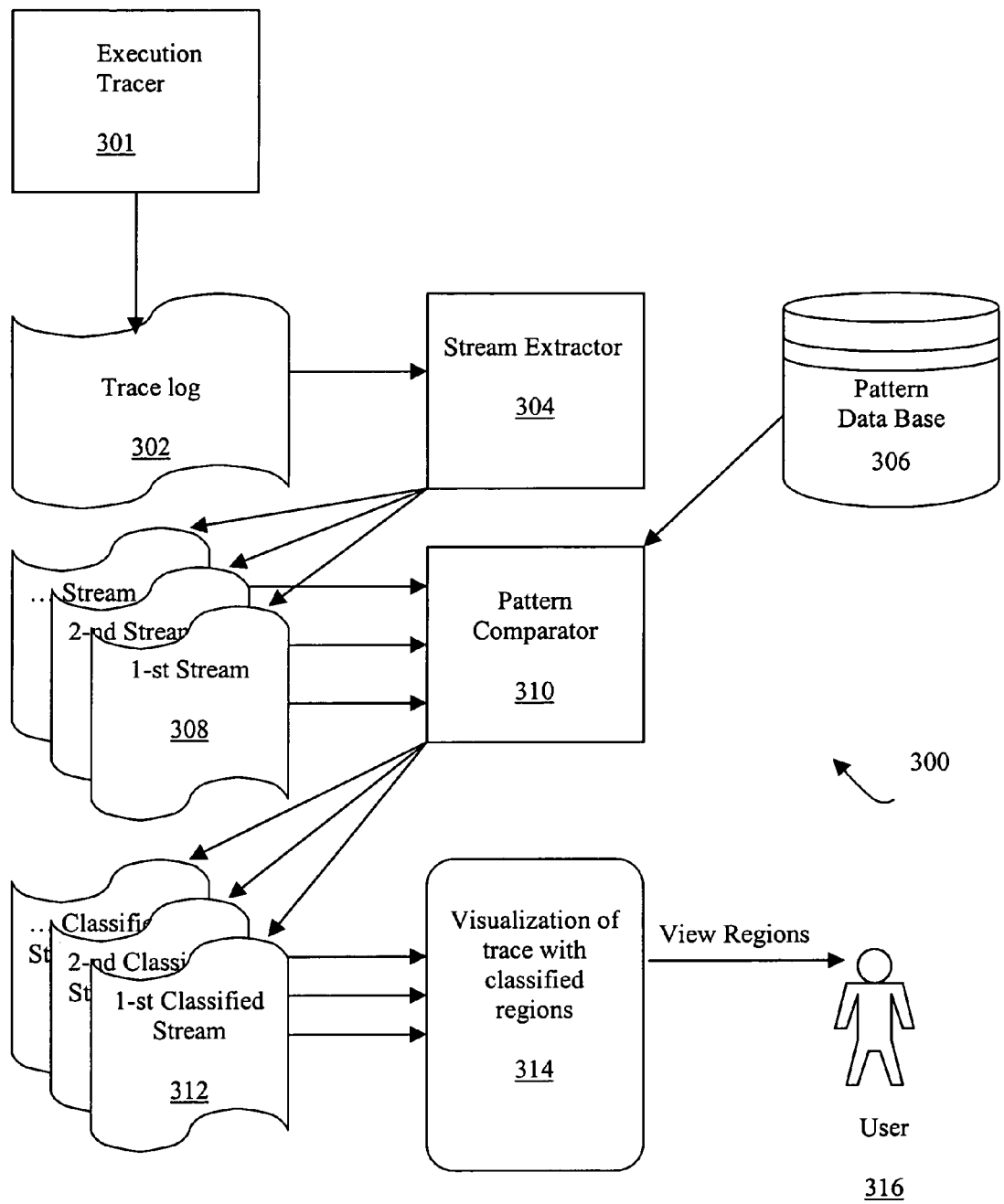
FIG. 3 is a block diagram of the situation-recognition process.

FIG. 3 is a block diagram of a situation recognition mode 300, where a pattern database 306 created during the learning stage is used for the classification of trace operations. In FIG. 3, an execution tracer 301 produces a trace log 302. The trace log 302 is initially post-processed and separated into logical streams 308 by a stream extractor 304. A pattern comparator 310 detects patterns in the streams corresponding to patterns stored in the pattern base 306. Detected patterns are used for the creation of a classified trace view 314 that is presented to the user 316.

Each pattern represents a sequence of operations performed by the traced application under certain conditions. A pattern can be represented as:

$O_1, O_2, \ldots, O_i, O_{i+1} \ldots, O_N$ where $O_i$ represents the i-th operation. N is the length of the pattern sequence, and can be selected empirically. In some embodiments 1<N<10. In another embodiment, N 10.

A stream of operations is separated into overlapping subsequences of the constant length N. For example, consider learning a stream of eight operations in a trace log a b c d e f g h For the case of pattern length N equal to 6, the following patterns will be extracted:

a b c d e f b c d e f g c d e f g h

Meaningful sequences of operations in complex modern applications are selected for analysis. Many modern applications are complex, being multithreaded, and in many cases executed in distributed multi-user environment. Simple time ordering of system calls is too low-level a representation that is influenced by many random or irrelevant factors. The sequences in the patterns stored in the pattern database preferably reflect the internal logic of the program. To identify the patterns, the sequential trace log is pre-processed and separated into logical streams reflecting certain semantic or logical sets of operations. For example, operations can be separated into streams according to: operations belonging to a particular thread; operations performed by particular user of the application; operations belonging to particular transactions, operations belonging to particular user action; operations belonging to a particular function body; etc. Note that with regard to operations belonging to particular transactions, there can be numerous definitions of transactions depending on the semantic of the application class.

In one embodiment, recorded operations have a tree-like structure of nested function calls. In one embodiment, two options are provided for linearization of nested calls into a linear sequence of events:

(1) tree-walk around trees of call operations to reduce the call operations into one thread-dependent linear stream (a traditional approach); and/or (2) tracking each non-zero level as a separate stream. As a special case, it is possible to generate patterns only for operations of level zero. This allows the user to ignore non-important low-level events.

The user can generate shortened patterns that contain M<N operations. Shortened patterns are generated in the user-guided learning mode if a region selected for learning contains less than N operations. Each new combination of N or fewer successive operations is saved in the pattern database in association with the identifier of the situation class: 0 for normality; 1 or above for user-defined special situations. A pattern can be saved with multiple class identifiers.

Each operation $O_i$ is characterized by a number of characteristics. The characteristics can include, for example, one or more of: an invocation point, a function entry point, a return code, an operation type, function arguments, etc. The invocation point can include, for example, an invoking module name, invocation offset, etc. The function entry point can include, for example, the calling module name, the entry offset, etc. The return code can include, for example, a normal return code, an abnormal return code etc. In one embodiment, additional knowledge about the function is used to determine if the return code value corresponds to a normal situation, or an error condition. The operation type can include, for example, a function call, creating a thread, exiting a thread, a pseudo-operation (e.g., stream opening, closing, padding, etc.), etc.

In one embodiment, deterministic and/or statistical procedures are used for the classification process. A deterministic procedure is typically used in cases where specific patterns are typical for a particular situation. In most cases, the presence of a single situation pattern or absence of any learned patterns is not enough for reliable classification. For example, there can be cases of patterns belonging to several classes, or limitations of statistics during learning when not all patterns of normal execution situations were encountered. Moreover a region can contain patterns of several classes.

In order to increase reliability of the classification, a statistical procedure is used in some embodiments. In one embodiment, a statistical procedure is based on a selection of regions of consecutive stream operations, and calculation of densities of pattern matches for all database-known execution situation classes. The density value for a situation class in a region of stream-adjacent operations is defined as a ratio of pattern matches for the class to the whole number of operations in the region.

In one embodiment, the classification process is described as follows. Select a region $R^n$ of n adjacent stream elements. A density $D^n_i$, $0 \ D^n_i \ 1$ is assumed, for a specific execution class i. One can choose regions of different lengths 1, 2, etc. covering the same target stream element: $R^1$, $R^2$, .... For efficiency reasons, the upper limit is set to the locality frame size F (30 by default in some embodiments). In other embodiments, locality frame size F can be set smaller or greater than 30. For a stream element, there are F density values for the chosen situation class i: $D^1_i, D^2_i, \ldots, D^F_i$. Let $R_j$ to be a region that delivers the maximal density: $D_i = \max_j\{D^j_i\}$. If there are multiple candidates the lengthiest region is chosen.

The database-known situation classes are enumerated to receive the best density regions $R_0$, $R_1$, etc. for classes 0, 1, ... that cover the target stream element. The target element is attributed to an execution class n that delivers the maximal density: $D = \max_i\{D_i\}$. If there are multiple candidates to deliver the maximal density D, then the class with minimal ID is chosen. Thus, the normal execution class takes precedence over classes of special situations. If, however D<T where T is a density threshold (0.8 by default in some embodiments), the target element is assigned to an unknown situation (abnormality), with conditional density $D_{-1}=1-D$.

To reduce overhead, the algorithm implementation can deduce a situation class of the maximal density for each following stream operation with minimal looking back over operation sequences of different length.

For the current stream element, the algorithm processes F (locality frame) regions that end with the current element. As a result, the situation class C and the region length L delivering the maximal density D are deduced and the class C is assigned to the current element. The class C can also be optionally assigned to up to L−1 preceding elements replacing the class previously ascribed to them. Such replacement spreads back until an element is found whose class was assigned with a density value greater than D.

Backward-processing orientation of the algorithm can be used for support of on-line analysis of an operation stream while it is appended with new operations.

During the learning mode, an attempt to add a new pattern is made as a result of processing operations. The situation class (the execution class) is a parameter of the learning process. In the automatic learning mode the default situation class is a broad class of "Normal Execution". In the user-guided learning mode situation classes are defined by the users.

Figure 4:
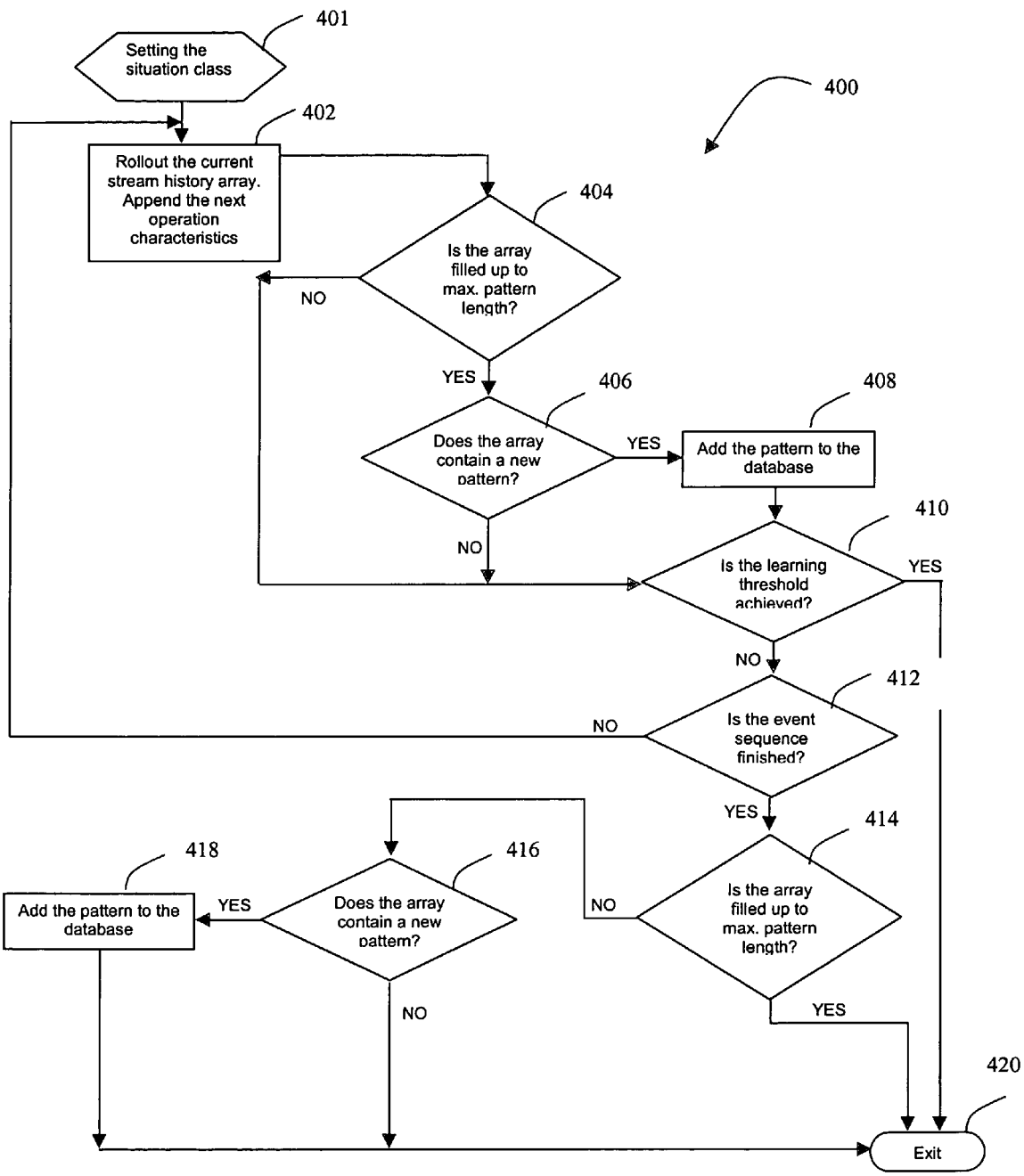
FIG. 4 is a flowchart of the learning algorithm.

FIG. 4 is a flowchart of the learning algorithm, which starts in a block 401 that sets the situation class to be learned. In the simplest case, the default situation class is a broad class described as normal execution. Other cases include different abnormal execution classes, such as database or network connectivity problems, file locking problems, etc. A stream history array is filled by an operation characteristics block 402 until it reaches the maximum pattern length (tested in a block 404). If the array contains a new pattern (tested in a block 406), this pattern is appended to the database in a block 408. The process blocks 404-408 are repeated until the learning threshold reached (tested in a block 410). If the learning is not finished, the algorithm checks if the event sequence is finished (tested in a block 412). If the event sequence is not finished, then the sequence of blocks 402-410 is repeated again; otherwise, the event sequence is checked to determine if the array is filled to the maximum pattern length (tested in a block 414). If the maximum length is reached, then the learning process exits in an exit block 420; otherwise, a check is performed so determine if the array contains a new pattern (tested in a block 416). In a case if this pattern is new, then it is added to the database in a block 418; otherwise, the algorithm exits at the exit block 420.

Figure 5:
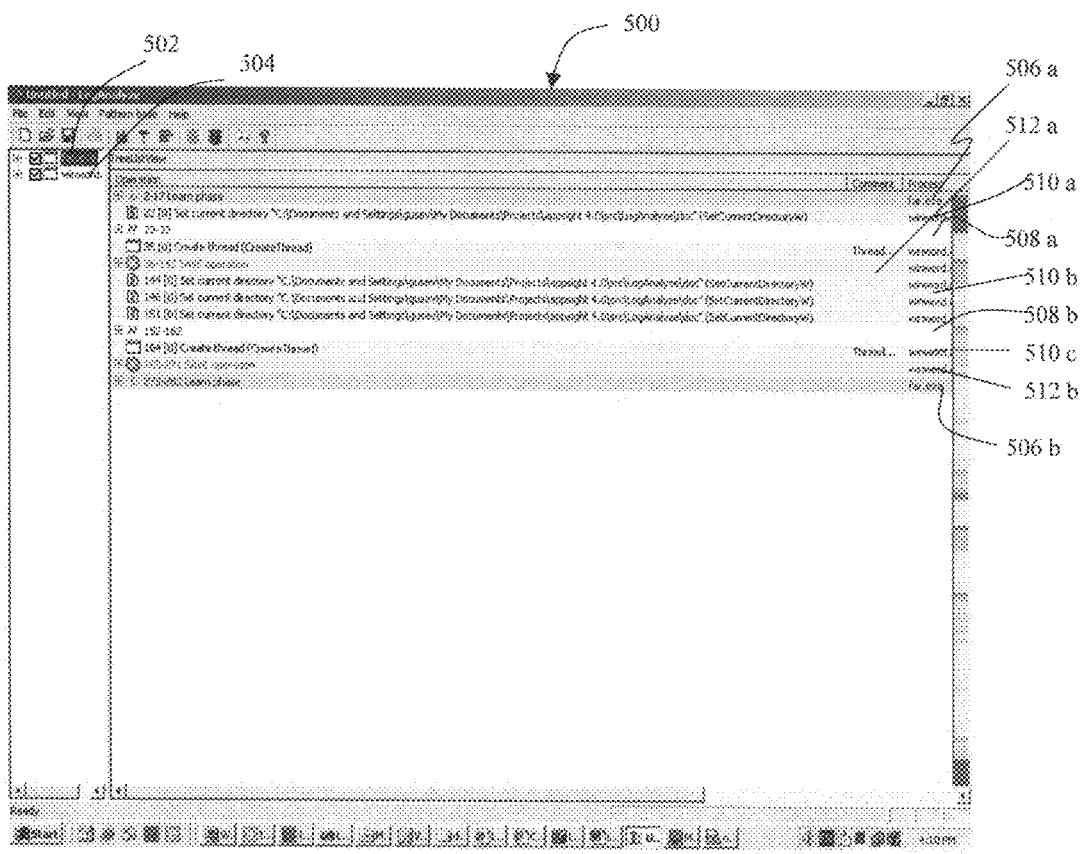
FIG. 5 shows a collapsed situation view.

A set of Graphical User Interface objects (described in connection with FIGS. 5-13) are used to guide the user through the workflow of pattern learning and situation classification. FIG. 5 shows a typical situation view window for an example of tracing two parallel processes of applications Far.exe 502 and WinWord.exe 504. The first application is under learning and the second one is under abnormality detection. FIG. 5 includes an operation column, a comment column, and a process column.

In one embodiment, background color-coding is used to provide certain information to the user. Operations related to an application under learning are background-colored in light blue 506a, 506b. Operations related to an application in a recognition mode have a more complicated coloring scheme depending on the situation class: The situation corresponding to normality is shown in a white background (as shown, for example, in lines 508a and 508b). An unknown situation (abnormality) is shown in a pink background (as shown, for example, in lines 510a, 510b, and 510c). Situations corresponding to a specific class are shown in a light-yellow background (as shown, for example, in lines 512a and 512b). The colors used to illustrate examples are not limited thereto. Other color schemes or designation schemes can be used.

In contrast to an ordinary trace event view (as shown, for example, in FIG. 3A of U.S. Pat. No. 6,202,199), nodes of a given level in the trace event tree of FIG. 5 are assembled under an additional labeling item if those nodes are assigned to the same known situation class, or if the nodes relate to an application under learning. Labeling items are supplied with class-dependent icons and labeled with a range of identifiers of descendant events. Special situation items are additionally labeled with a legend of the class. For example, in FIG. 5, headers are shown in line 506a for operations 2-17 (learning) and in line 506b for operations 272-282 (learning). FIG. 5 shows normal execution operations are shown, for example in lines 508a for operations 23-33 508a and in line 508b for operations 152-162. Line 512a, corresponding to operations 36-142 and line 512b, corresponding to operations 165-271 show a special WinWord situation class 'SAVE operation'.

In one embodiment, unknown situation operations (pink background) are not supplied with labeling and are presented in expanded form in order to attract the user's attention.

Operations that are considered failed are text-colored in red in the comment column (no failed operations are shown in FIG. 5). By default, text in the operation column is black. It changes color to red for parent operations that have pink-background child operations. Such a such situation is illustrated in FIG. 5 by lines 506a and 512b that are class labeling items.

Figure 6:
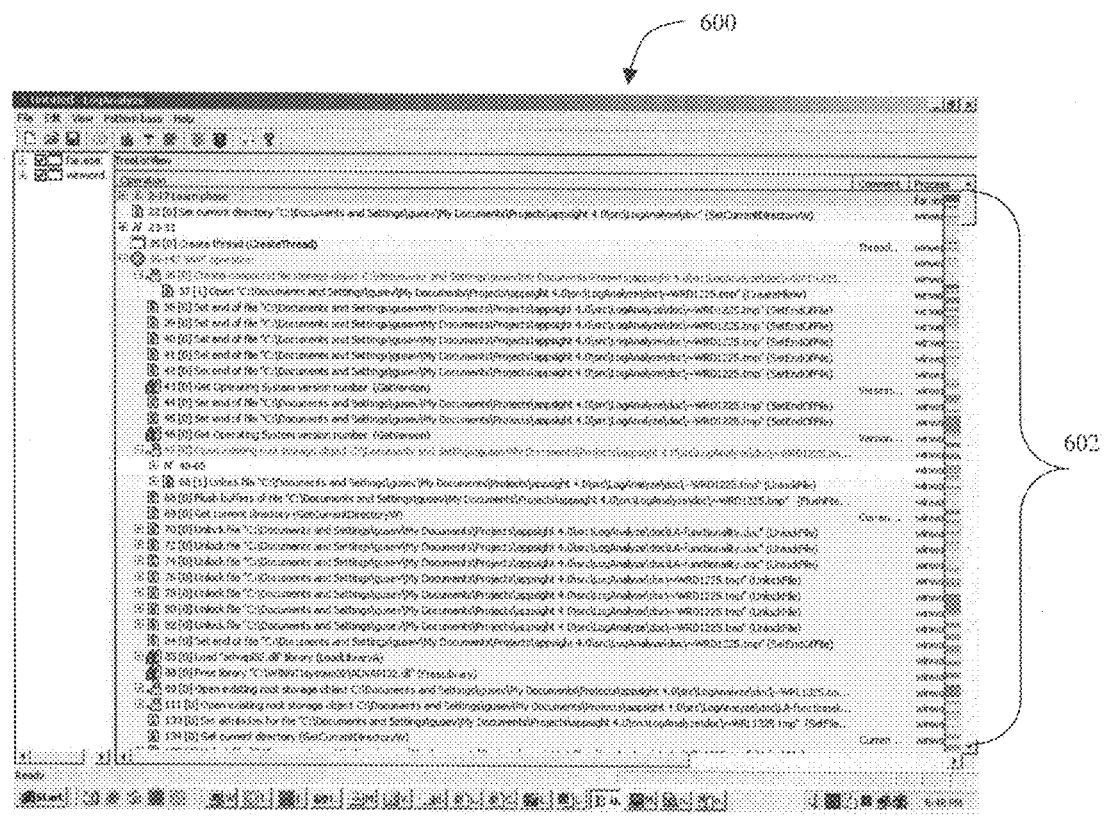
FIG. 6 shows an expanded situation view.

In one embodiment, as a default, the parent operation and labeling items are initially collapsed. An exception is made for parent items that head, directly or indirectly, pink-background operations, where the parent items are initially expanded in order to attract the users attention to unknown situations. View items in FIG. 5 are shown after being collapsed. FIG. 6 shows the same view as FIG. 5 when initially expanded.

The right side of the window in FIG. 6 (and FIG. 5) includes a bar 602 that shows event sequence zones of each situation class (or learning zone) in position and length proportional to the length of the whole sequence. Zone colors are similar to those used for view item backgrounds. The proportionality bar allows easy navigation through the trace by clicking regions corresponding to the particular class zones. It also visually reflects the degree of the log compression.

The user controls the program by using context and conventional GUI controls such as menus, toolbar buttons, dialog boxes, and the like. Control actions can be conveniently described in terms of functional groups. A Group 1 provides controls for setting options and showing the pattern base state. Settings for Group 1 include opening the 'Options' dialog window. Show state options for Group 1 include opening the 'Pattern base' dialog window. A Group 2 provides controls for filtering by thread and clearing the thread filter. When filtering the thread, the situation view filters by a thread that the selected operations belong to. When the thread filter is cleared, the situation view returns to the unfiltered state. A Group 3 controls includes tree-handling selection of zero-level nodes, the node one level up, the nodes one level down, etc. A "Select zero-level nodes" control selects all zero-level nodes and makes the first zero-level node visible. A "Select node one level up" control moves selection and visibility to the parent node. A "Select nodes one level down" control expands the nodes under the selection and moves selection to its child nodes.

A Group 4 controls includes learning control operations such as: stop learning; learn selection; forget selection; undo last learning; properties; etc. Stop learning opens the open the 'Stop learning' dialog window. Learning selection open the 'Do learning' dialog window. Forget selection opens the 'Undo learning' dialog window. Undo last learning returns the pattern base to a state before the last user-guided learning. A Group 5 includes showing the properties window.

Figure 7:
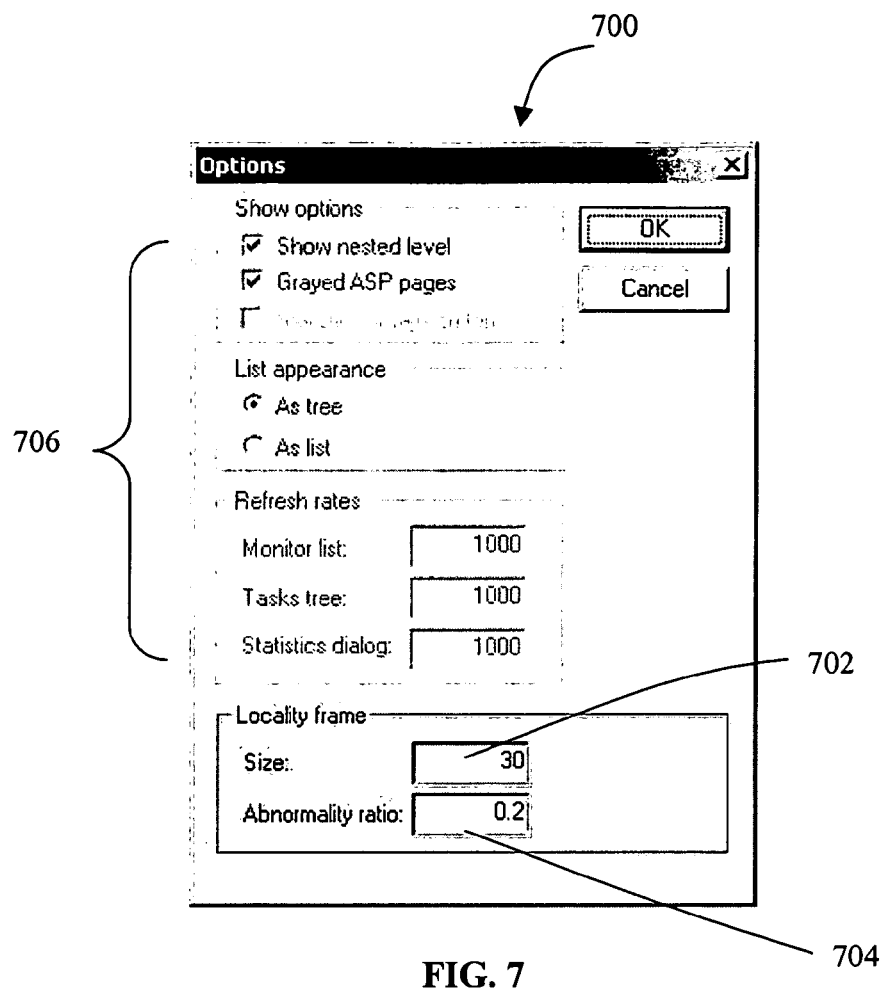
FIG. 7 shows an "Options" dialog box that allows the user to specify classification parameters.

FIG. 7 shows an 'Options' dialog that allows the user to set the main parameters of the situation classifier. A locality frame size control 702 allows the user to define how many operations are analyzed in a stream to define a region of maximal density of pattern matches. An abnormality ratio control 704 allows the user to specify the density threshold. If the best density for a pattern-base-known situation class is less that the threshold, then operations are assigned to the unknown situation. Other options are not directly related to abnormality detection and are shown dimmed 706. When the options locality frame size and/or abnormality ratio are set by the user, the abnormality classifier re-parses the operation sequence and refreshes the situation view.

Figure 8:
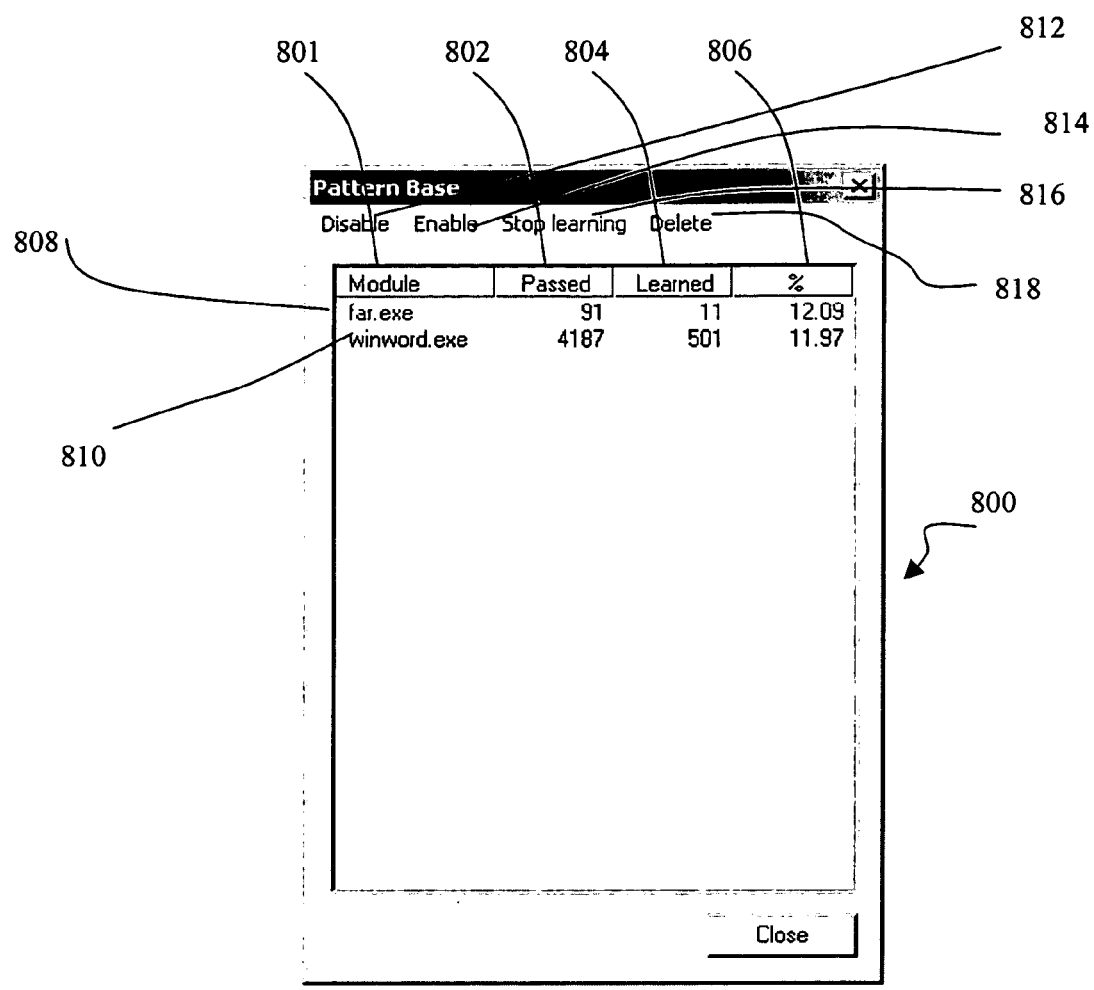
FIG. 8 shows a "Pattern Base" dialog that allows the user to review and control the pattern database state.

FIG. 8 shows a 'Pattern base' dialog 800 that allows the user to inspect and to control the pattern base state. The pattern base dialog 800 enumerates the patterns existing in the pattern base. For every module 801 the following information is shown: a column 802 shows how many operations were passed during initial automatic learning; a column 804 shows how many unique patterns were extracted; and a column 806 shows the learning saturation ratio of unique patterns to all operations passed.

In one embodiment, a coloring scheme is applied to show the current status of the pattern file related to specific module. Grey is used to indicate that the file is disabled and the situation classifier neither appends it with new patterns nor assigns any situation classes to operations. Red is used to indicate that the file is inconsistent and can be fixed by deleting only; it is also disabled. Blue is used to indicate that the file is under learning. The state 'under learning' is an initial state for new pattern files. The situation classifier supplies all new patterns with the normality class identifier and accumulates them in the pattern file. Upon stopping learning, either automatically, by applying the threshold for the learning saturation ratio, or manually, the pattern file goes to the state 'under situation detection'. Black is used to indicate that the file is under situation detection. User-guided learning can be made in this state only.

The window menu items shown in FIG. 8 include: Disable 812 (Make the file disabled), Enable 814 (make the file enabled), Stop learning 816 (open the 'Stop learning' dialog window) and Delete 818. The Delete item 818 include sub-items Disable from now (Delete the file) and Learn afresh (Empty the file and make it open for learning).

Figure 9:
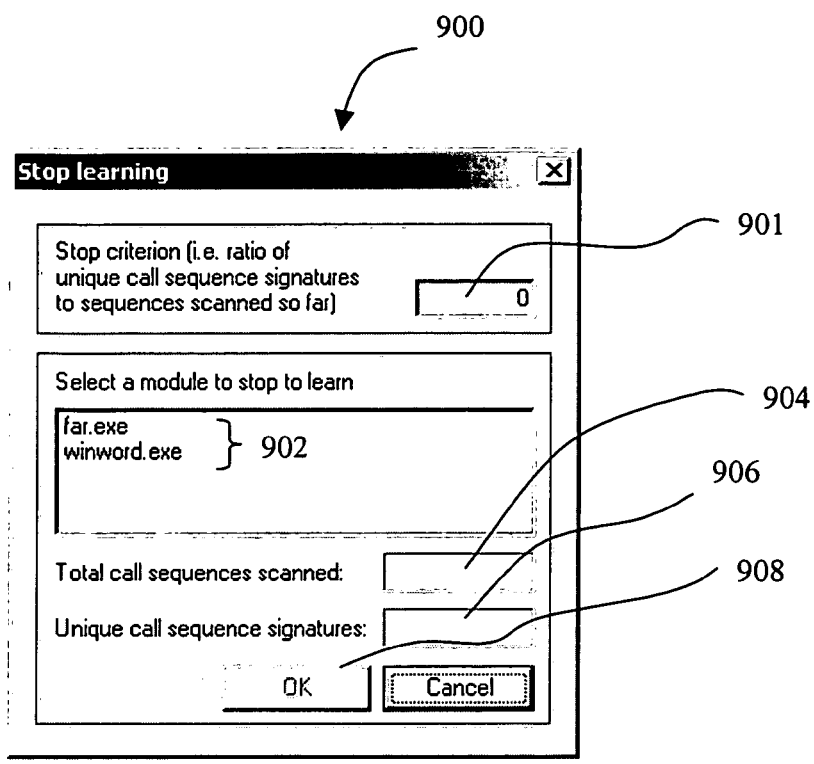
FIG. 9 shows a "Stop Learning" dialog that allows the user to stop automatic learning.

FIG. 9 shows the 'Stop learning' dialog 900 used to stop automatic learning. The stop learning dialog 900 is used to finish the pattern learning process for modules that relate to operations in the situation view and are under learning. The dialog 900 lists the modules and allows the user to select a specific module. If no module selection is made, the stop learning dialog 900 can nevertheless be applied for setting the threshold of the learning saturation ratio (the 'Stop criterion' field 901). Unless the threshold value is zero, a pattern file under learning that achieves the learning saturation ratio less than the threshold value is automatically closed for automatic learning normal patterns and begins to assist the situation classifier to detect known/unknown situations. If a module is selected, the window shows how many operations have been passed for the module and how many unique patterns have been extracted for the module. Pressing an 'OK' button 908 manually stops the automatic learning mode for the selected module.

Figure 10:
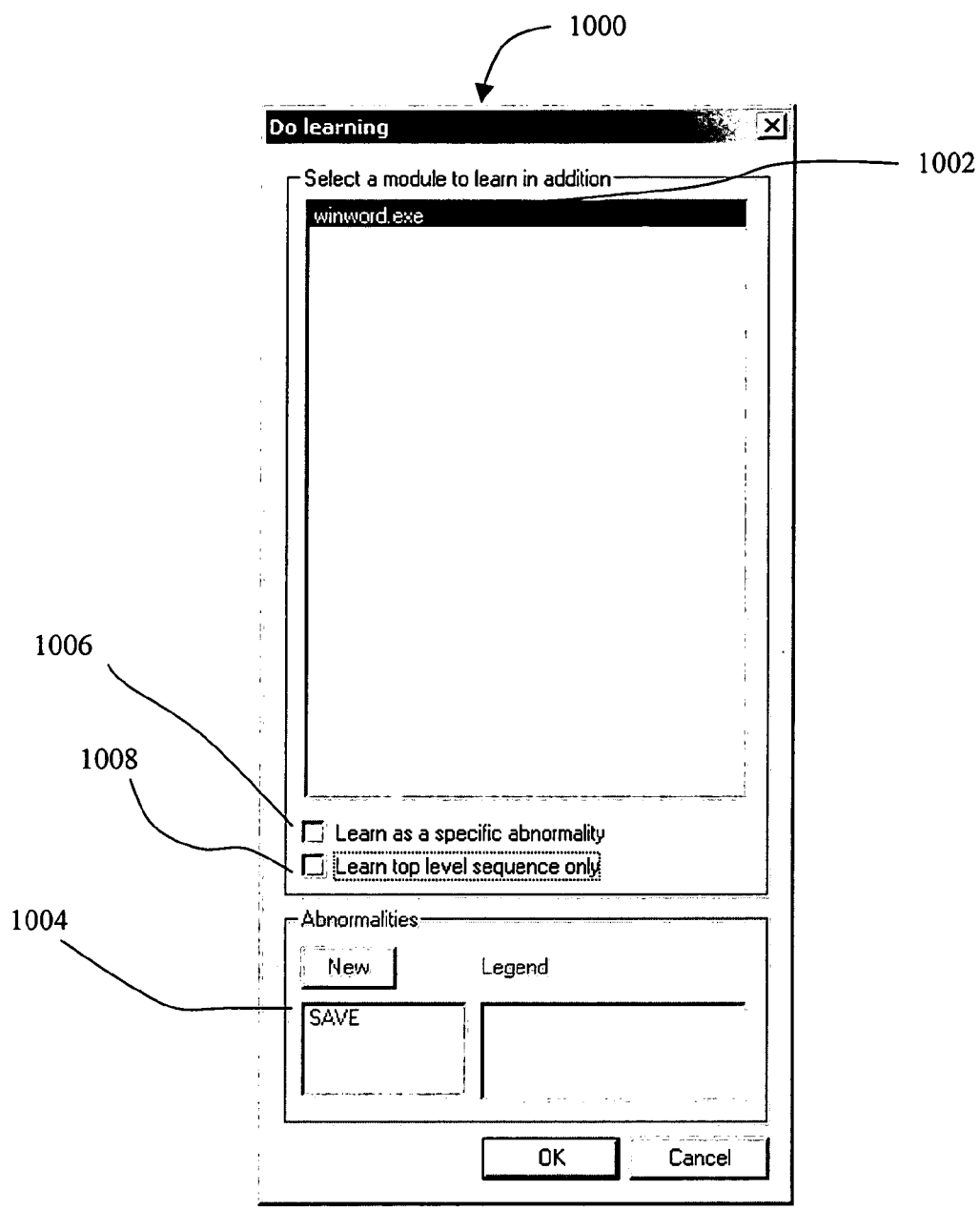
FIG. 10 shows a "Do Learning" dialog that is used for user-guided learning.

FIG. 10 shows a 'Do learning' dialog 1000 used for user-guided learning. The dialog 1000 enumerates enabled module pattern files that relate to selected operations in the situation view and are currently under situation detection. Once a module pattern file 1002 is selected, its list of currently defined special situation classes is shown in the 'Abnormalities' box 1004.

As a result of user-guided learning, the situation classifier re-scans a subset of selected operations that relate to the selected pattern file and appends new patterns to the file. Users are free to assign these patterns either to normality or to a special situation class (e.g., using a 'Learn as a specific abnormality' checkbox 1006). If a new special situation class is created, the user may be given the option to input the legend text for it.

According to a 'Learn top level sequence only' checkbox 1008 checkbox, scanning can be made either for all operations or for the top-level operations only. Scanning the top-level stream exclusively may be desirable because the lower level operations frequently do not really identify the situation. After successful user-guided learning the situation view is refreshed.

Figure 11:
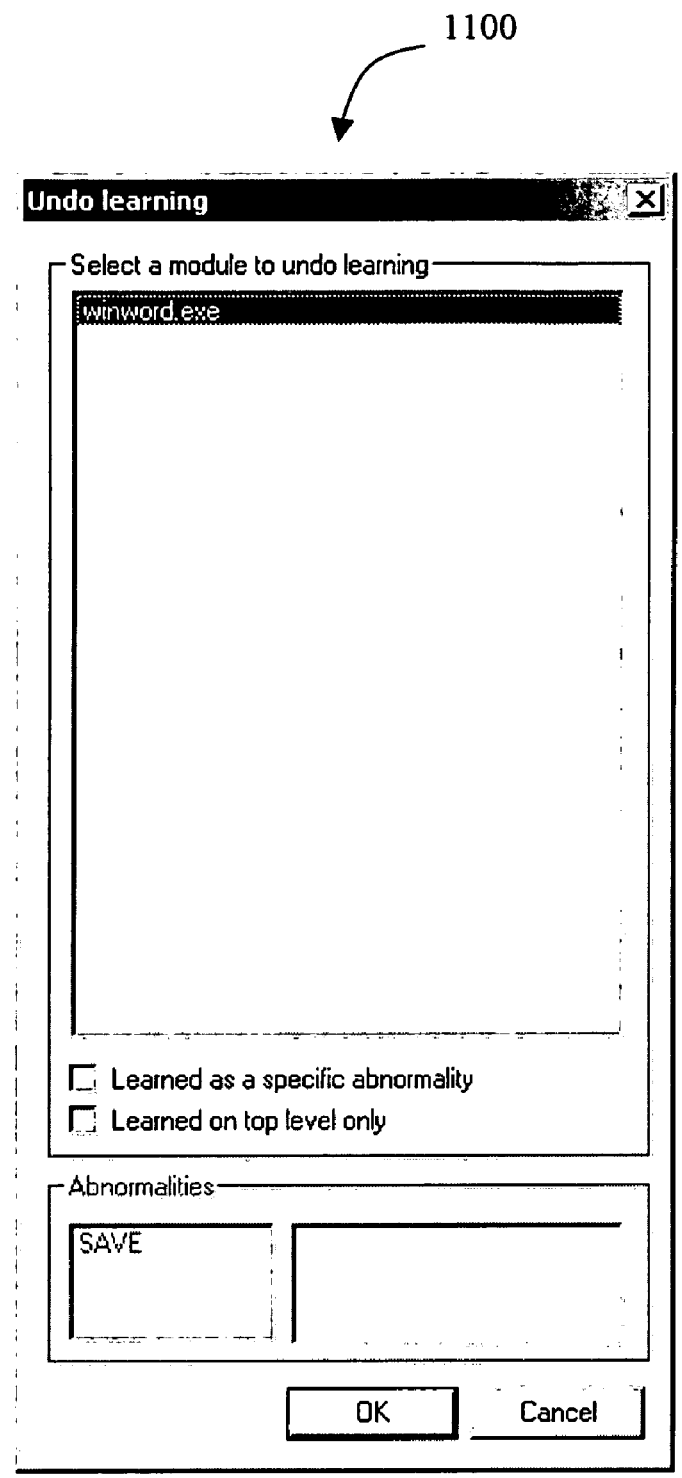
FIG. 11 shows an "Undo Learning" dialog that is used to remove selected patterns from the module pattern file.

FIG. 11 shows an 'Undo learning' dialog 1100. This dialog 1100 is similar to the dialog 1000. However, in the dialog 1100, the selected operations generate patterns that are removed from the module pattern file under selection.

Figure 12:
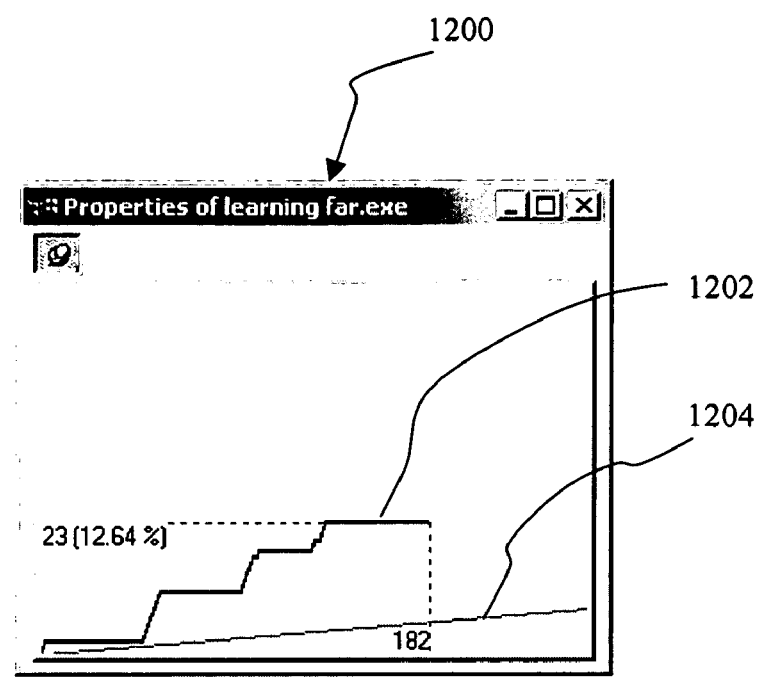
FIG. 12 shows a "Properties" window that provides a graph showing pattern database activity corresponding to adding new patterns to the pattern database.

FIG. 12 shows a properties window 1200 that tracks what kind of selection is made in the situation view and updates the content of the window 1200 accordingly. If a selection is made for an application under automatic learning the window 1200 shows a historical graph 1202 of appending new patterns to the correspondent pattern file. The example in FIG. 12 shows that 182 operations have been scanned and 23 unique patterns have been extracted for Far.exe. A linear curve 1204 corresponds to the learning threshold currently set for stopping the automatic learning mode. The history graph is tracked across any number of runs of the situation detector until the automatic learning process finally stops.

Figure 13:
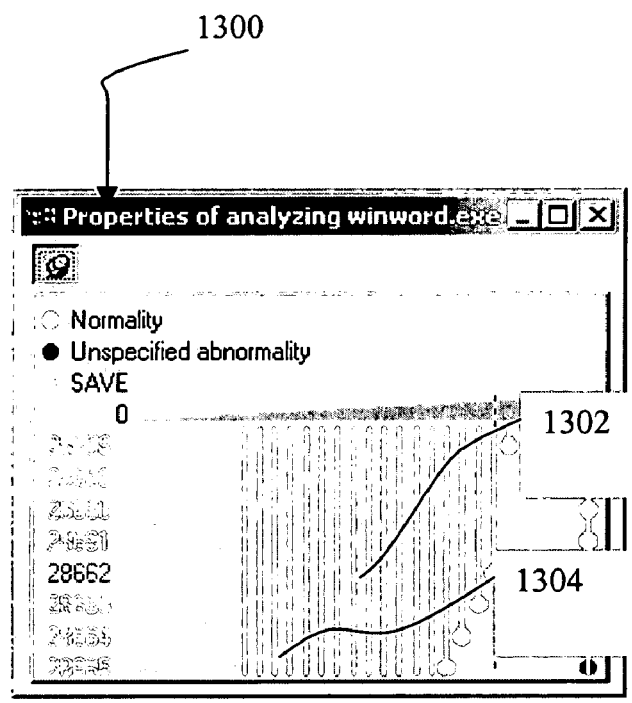
FIG. 13 shows how decisions have been made to assign a situation class.

FIG. 13 shows a properties window 1300 that shows how decisions have been made to assign a situation class. The view in FIG. 13 can be understood with knowledge of the situation detection algorithm. Vertical lines painted in colors dependent on situation classes correspond to competing density/region values. A rightmost line 1302 represents the resulting decision on situation class assignment. A dashed black line 1304 corresponds to the density threshold currently set for assigning operations to an unknown situation.

In one embodiment, the formatting string for naming pattern files can be specified by the user. The macro string %s inserts the application module name (%s.db by default). The formatting string for naming backup pattern files can also be specified using the %s macro (%s.bak by default). A pattern base generation code can be specified. For example, a value of 2 indicates that tracking of patterns is made for the call stack level 0. A value of 3 indicates that tracking of patterns is made for every call stack level independently (by default). A value of 4 indicates that tracking of patterns is made by walking along call trees. A maximum pattern length can be specified as 2 or more (6 by default). In one embodiment, these values are set when a new pattern base is created.

In addition, users can customize the default values for locality frame size, abnormality ratio threshold, automatic learning saturation ratio threshold, etc. For example, in one embodiment, the default locality frame size can be specified as 2 or more (30 by default). In one embodiment, the default abnormality ratio threshold can be specified in the range [0, 1] (0.2 by default). In one embodiment, the default automatic learning saturation ratio threshold can be specified in the range [0, 1] (0 by default, i.e. no automatic stop). Default values for other parameters can also be set by users in other embodiments.

It will be evident to those skilled in the art that the invention is not limited to the details of the foregoing illustrated embodiments and that the present invention may be embodied in other specific forms without departing from the spirit or essential attributed thereof; furthermore, various omissions, substitutions and changes may be made without departing from the spirit of the inventions. The foregoing description of the embodiments is therefore to be considered in all respects as illustrative and not restrictive, with the scope of the invention being delineated by the appended claims and their equivalents.

What is claimed is:

1. A method for analyzing execution traces of a computer program, comprising:
   receiving a set of identifiers of situation classes as parameters;
   accumulating execution patterns during execution of the computer program, the computer program being executed in accordance with the set of identifiers of situation classes;
   associating at least some of the execution patterns with corresponding situation classes of the set of identifiers of situation classes to produce classified execution patterns;
   storing the classified execution patterns in a database;
   identifying a diagnostic-mode execution pattern while executing the computer program in a diagnostic mode;
   identifying, using a computer processor, a classified execution pattern that matches the identified diagnostic-mode execution pattern to identify a situation class corresponding to the execution of the program in the diagnostic mode; and
   providing an indication of the corresponding situation class, whereby the indication allows a user to assess abnormalities in the execution of the program in the diagnostic mode.

2. The method of claim 1, wherein associating at least some of the execution patterns with corresponding situation classes comprises classifying the execution patterns into normal and abnormal execution patterns, the abnormal execution patterns comprising a relatively high number of unknown patterns.

3. The method of claim 1, wherein one of the set of identifiers of situation classes is a file saving operation situation class, and wherein associating at least some of the execution patterns with corresponding situation classes of the arbitrary number of situation classes to produce classified execution patterns comprises associating at least one of the execution patterns with the file saving operation situation class.

4. The method of claim 1, wherein one of the set of identifiers of situation classes is a file opening operation situation class, and wherein associating at least some of the execution patterns with corresponding situation classes of the arbitrary number of situation classes to produce classified execution patterns comprises associating at least one of the execution patterns with the file opening operation situation class.

5. The method of claim 1, wherein one of the set of identifiers of situation classes is a site browsing operation situation class, and wherein associating at least some of the execution patterns with corresponding situation classes of the arbitrary number of situation classes to produce classified execution patterns comprises associating at least one of the execution patterns with the site browsing operation situation class.

6. The method of claim 1, wherein one of the set of identifiers of situation classes is a mail sending operation situation class, and wherein associating at least some of the execution patterns with corresponding situation classes of the arbitrary number of situation classes to produce classified execution patterns comprises associating at least one of the execution patterns with the mail sending operation situation class.

7. A method of analyzing execution traces of a computer program, comprising:
   receiving a set of identifiers of situation classes as parameters;
   accumulating execution patterns for an application during execution of the computer program in accordance with the set of identifiers of situation classes;
   classifying the execution patterns by the set of identifiers of situation classes to produce classified execution patterns;
   tracing execution patterns of a copy of said program being diagnosed;
   comparing, using a computer processor, the traced execution patterns to the classified execution patterns to produce matching traced execution patterns and matching classified execution patterns;
   identifying trace regions corresponding to the matching traced execution patterns; and
   displaying trace regions according to a likelihood that said trace regions indicate improper execution of said copy of said program, wherein the likelihood is determined based at least in part on situation classes associated with the matching classified execution patterns.

8. The method of claim 7, wherein displaying trace regions according to a likelihood that said trace regions indicate improper execution of said copy of said program comprises determining which of said trace regions contain unknown patterns.

9. A system for analyzing execution trace data of a computer program, comprising:
a processor configured to operate in a learning mode wherein the processor maintains a user-defined number of execution classes as parameters, accumulates patterns of operations during execution of the computer program in accordance with the user-defined number of execution classes, and associates one of the user-defined number of execution classes with each of said patterns, said patterns stored in a pattern database; and
wherein said processor is further configured to operate in a recognition mode wherein the processor matches execution trace information against said patterns to identify one or more trace regions, the trace information being collected while executing a copy of the computer program during the recognition mode, the processor further associating each of said trace regions with an execution class corresponding to an execution class associated with a pattern.

10. The system of claim 9, wherein said learning mode comprises automatic learning.

11. The system of claim 9, wherein said learning mode comprises user-guided learning.

12. The system of claim 9, wherein a first trace region of said one or more trace regions is attributed to an abnormal execution class.

13. The system of claim 9, wherein a first trace region of said one or more trace regions is attributed to an abnormal execution class if said first trace region contains a relatively high density of unknown execution patterns.

14. The system of claim 9, wherein said system is configured to allow a user to delete patterns from said pattern database.

15. The system of claim 9, wherein said system is configured to allow a user to add patterns to said pattern database.

16. A method for application learning, comprising:
storing one or more user-defined execution categories as parameters;
collecting, using a computer processor, a learning mode trace log of an application, during execution of the application according to the execution classes, to produce trace data;
separating said trace data into logical streams;
generating patterns from said logical streams; and
storing said patterns in a pattern database, wherein each of the user-defined execution categories is associated with at least one of the stored patterns in the pattern database,
wherein the pattern database is configured to provide information sufficient to enable a processor to identify a pattern in a diagnostic mode trace log of the application being diagnosed that matches a pattern stored in the pattern database, and determine an execution category associated with the pattern in the pattern database.

17. The method of claim 16, further comprising:
displaying at least a portion of said learning mode trace log on a classified trace view for user evaluation;
selecting a region of said learning mode trace log as a user-selected region;
assigning said user-selected region to a first execution category; and
adding a pattern of said user-selected region and an indicator of said first execution category to said pattern database.

18. The method of claim 16, wherein said logical streams are separated at least according to application.

19. The method of claim 16, wherein said logical streams are separated at least according to thread.

20. The method of claim 16, wherein said logical streams are separated at least according to application users.

21. A computer-implemented method for evaluating execution trace data, comprising:
separating trace data into one or more logical streams;
receiving a set of user-defined situation class identifiers that identify situation classes in which a computer program may be executed;
filling a stream history array from at least a portion of data in a first logical stream to define a pattern, the data in the first logical stream being generated based on execution of the computer program in accordance with one of the situation classes;
adding said pattern to a pattern database as a new pattern if said pattern does not already not exist in said pattern database; and
associating with said new pattern the user-defined situation class identifier corresponding to the situation class in accordance with which the computer program was executed,
wherein the pattern database is configured to provide information sufficient to enable a processor to identify a pattern in a trace log of a copy of the computer program being diagnosed that matches a pattern stored in the pattern database, and determine a user-defined situation class identifier associated with the pattern in the pattern database.

22. The method of claim 21, wherein said streams are separated according to different threads.

23. The method of claim 21, wherein said streams are separated according to different processes.

24. The method of claim 21, wherein said streams are separated according to different applications.

25. The method of claim 21, wherein said streams are separated according to different software components.

26. The method of claim 21, wherein at least one of said situation class identifiers corresponds to a normal execution class.

27. The method of claim 21, wherein at least one of said situation class identifiers corresponds to an abnormal execution class.

28. A method for analyzing execution trace information of a computer program being diagnosed, comprising:
maintaining a pattern database comprising stored patterns gathered during execution of the computer program during a learning mode in accordance with an arbitrary number of situation classes, the situation classes being user-defined and passed as a parameter, wherein the stored patterns are associated with corresponding situation classes based on the execution of the computer program;
separating trace data gathered from the computer program being diagnosed into one or more logical streams;
identifying a match between at least a portion of data in a first logical stream and a stored pattern in the pattern database; and
displaying a situation class associated in the pattern database with said stored pattern in connection with said at least a portion of data.

29. The method of claim 28, wherein said streams are separated according to different threads.

30. The method of claim 28, wherein said streams are separated according to different processes.

31. The method of claim 28, wherein said streams are separated according to different applications.

32. The method of claim 28, wherein said streams are separated according to different software components.

33. The method of claim 28, wherein said situation class corresponds to a normal execution class.

34. The method of claim 28, wherein said situation class corresponds to an abnormal execution class.

35. The method of claim 28, wherein said displaying includes color-coding to indicate a situation class of said at least a portion of data.

36. The method of claim 28, wherein said displaying includes displaying said at least a portion of data in a trace tree.

37. The method of claim 36, wherein said displaying includes labeling of nodes assigned to the same situation class.

38. The method of claim 36, wherein said displaying includes displaying event sequence zones.

* * * * *

UNITED STATES PATENT AND TRADEMARK OFFICE
CERTIFICATE OF CORRECTION

| | | |
|---|---|---|
| PATENT NO. | : 8,032,866 B1 | Page 1 of 1 |
| APPLICATION NO. | : 10/808760 | |
| DATED | : October 4, 2011 | |
| INVENTOR(S) | : Valery Golender et al. | |

It is certified that error appears in the above-identified patent and that said Letters Patent is hereby corrected as shown below:

In column 12, line 19, in claim 21, after "already" delete "not".

Signed and Sealed this
Twentieth Day of December, 2011

David J. Kappos
*Director of the United States Patent and Trademark Office*